UNITED STATES PATENT OFFICE.

HENRI WEYMERSCH, OF PARIS, FRANCE.

ELECTRIC ACCUMULATOR OR SECONDARY BATTERY.

SPECIFICATION forming part of Letters Patent No. 660,979, dated October 30, 1900.

Application filed February 19, 1900. Serial No. 6,203. (No specimens.)

*To all whom it may concern:*

Be it known that I, HENRI WEYMERSCH, a citizen of the Republic of France, residing at Paris, in the Republic of France, have invented certain new and useful Improvements in Electric Accumulators or Secondary Batteries; and I do hereby declare the following to be a full, clear, and exact description of the invention, such as will enable others skilled in the art to which it appertains to make and use the same.

My invention relates to electric accumulators or secondary batteries of the kind described in the British specification No. 129, dated January 11, 1881, as the invention communicated by C. Faure, in which plates of lead are mechanically covered with a coating of metallic salts mixed with inert substances. Accumulator-plates made in this way are deficient in the power of storing electrical energy and when subjected to heavy electrical discharges, as required for tractive purposes, are quickly worked out and require constant renewal. Many ingredients have been tried to effect improvements both in the direction of increased electrical capacity and in the durability of the coating of salts, with the result that no material advance has been made in overcoming either of the aforesaid defects. By my invention, which I will now proceed to explain, I attain a material increase both in the capacity of the accumulator for the storage of electric energy and in the duration of the plates even when subjected to heavy discharges of electricity. To obtain these results, I add to the acidulated water as generally used for mixing the oxids and fixing the same to the metallic frames a certain quantity of pyridin ($C_5H_5N$) or any of the salts belonging to the same group, the plates when dry being dipped alternately in a bath of acidulated water (preferably sulfuric or hydrochloric acid) and in a mixed solution of pyridin-water and alcohol. This combination of pyridin with acid and alcohol has the effect of highly oxidizing the plates carrying the positive terminals, so as to greatly increase their electrical capacity, and the further effect of hardening the said positive plates to an extent which renders the buckling of the plates and the disintegration of the same almost impossible even at heavy electrical discharges.

Accumulators made as hereinbefore described not only last very much longer than the ordinary accumulator constructed on the Faure system, but are capable of yielding more than twenty ampere hours per kilogram of plate or nine ampere hours per pound.

Having now described my invention, what I wish to claim and secure by Letters Patent of the United States is—

In the manufacture of electric accumulators or secondary batteries, the process of increasing the electrical capacity and duration of the plates, which consists in dipping the plates when dry alternately in a bath of acidulated water and in a mixed solution of pyridin-water and alcohol, substantially as described.

In testimony whereof I affix my signature in presence of two witnesses.

HENRI WEYMERSCH.

Witnesses:
 COLAS A. SPLURE,
 E. GOURDIN.